United States Patent [19]

Seki

[11] Patent Number: 5,094,444
[45] Date of Patent: Mar. 10, 1992

[54] SHEET FEEDING DEVICE
[75] Inventor: Hiroyuki Seki, Urawa, Japan
[73] Assignee: Canon Kabushiki Kaisha, Tokyo, Japan
[21] Appl. No.: 547,846
[22] Filed: Jul. 3, 1990
[30] Foreign Application Priority Data Jul. 4, 1989 [JP] Japan .................. 1-172671

[51] Int. Cl.$^5$ .............................. B65H 5/00
[52] U.S. Cl. ...................... 271/267; 271/278
[58] Field of Search ........... 271/8.1, 84, 193, 264, 271/278, 267, 306; 310/323; 198/630

[56] References Cited

U.S. PATENT DOCUMENTS 4,763,776  8/1988  Okumura et al. .................. 198/630
4,955,598  9/1990  Hiroshige et al. ................. 271/194

FOREIGN PATENT DOCUMENTS 177243  6/1984  Japan .................. 271/264
2636    1/1986  Japan .................. 271/306
86333   5/1986  Japan .................. 271/193
62-285834 12/1987 Japan .
60532   3/1989  Japan .................. 271/278
1-22846 5/1989  Japan .................. 271/193
1-4569  6/1989  Japan .

OTHER PUBLICATIONS

"Construction of Ultrasonic Motors and Their Application", Yoshiro Tomikawa et al., (1988), pp. 195-197.

*Primary Examiner*—D. Glenn Dayoan
*Assistant Examiner*—Steven M. Reiss
*Attorney, Agent, or Firm*—Fitzpatrick, Cella, Harper & Scinto

[57] ABSTRACT

There is disclosed a sheet feeding device is constructed in a manner such that members such as piezo-electric elements for generating feeding forces to feed a sheet in the feeding direction are respectively provided for a rectilinear portion in the sheet feeding direction of an elastic member and a rectilinear portion perpendicular to the sheet feeding direction, and the end of the sheet can be fed until a front edge in the feeding direction of the elastic member and ejected out.

13 Claims, 5 Drawing Sheets

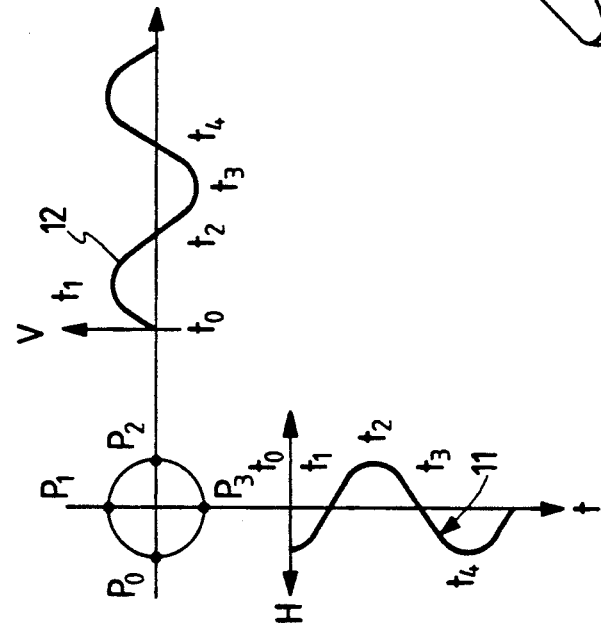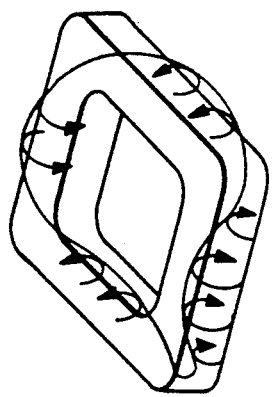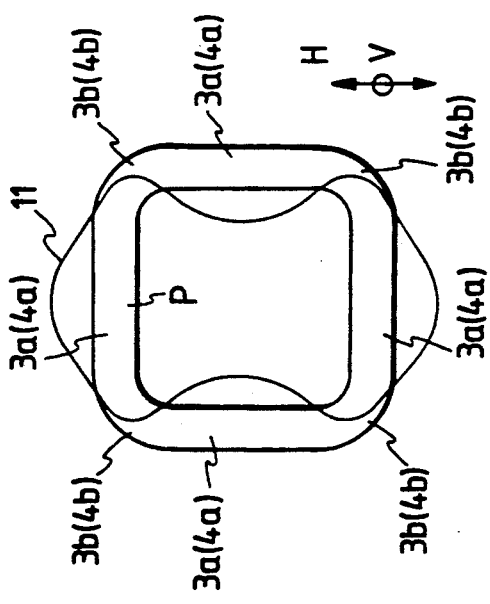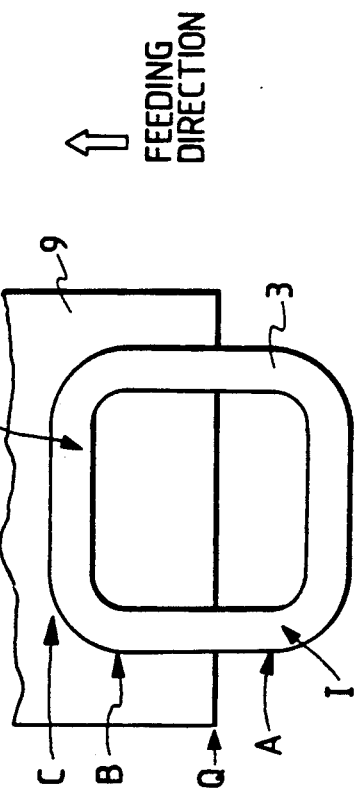

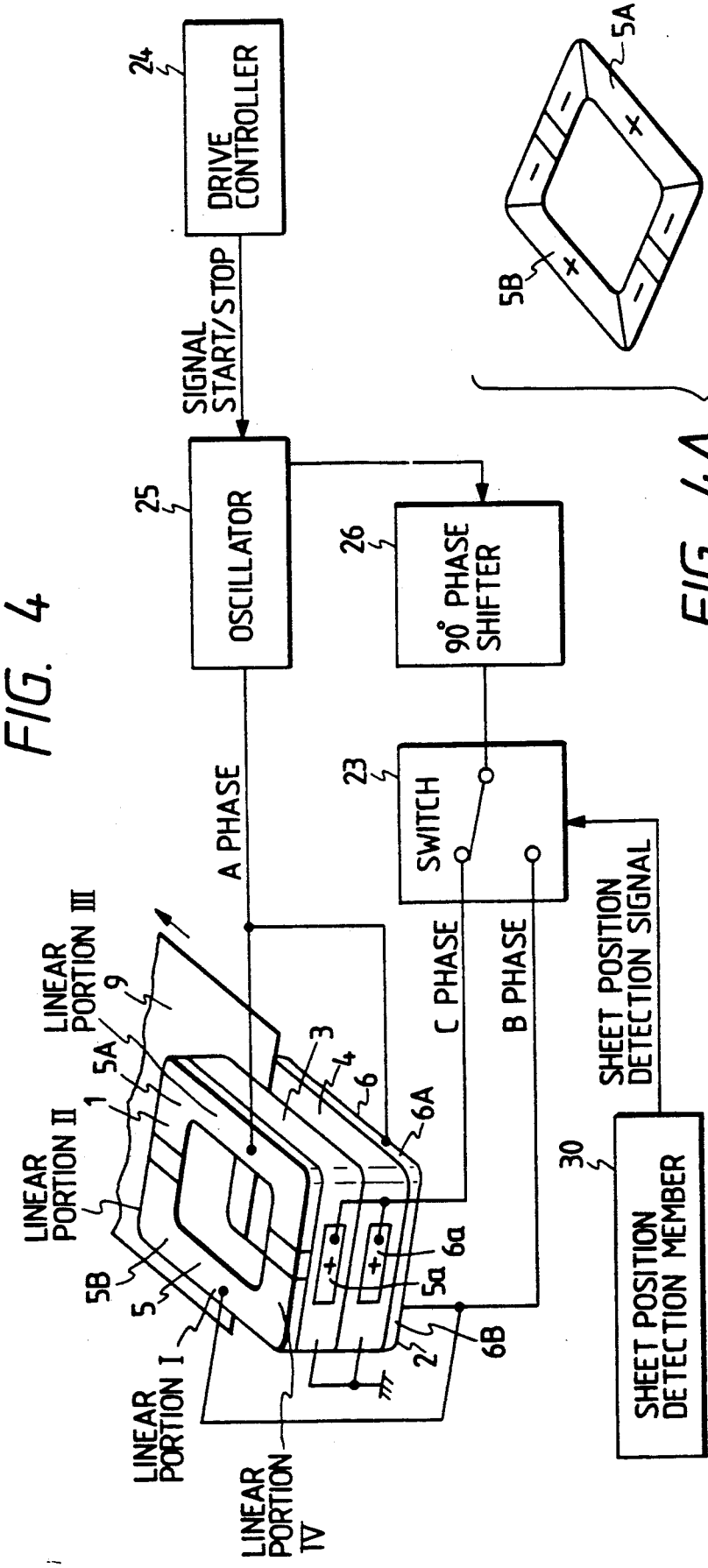

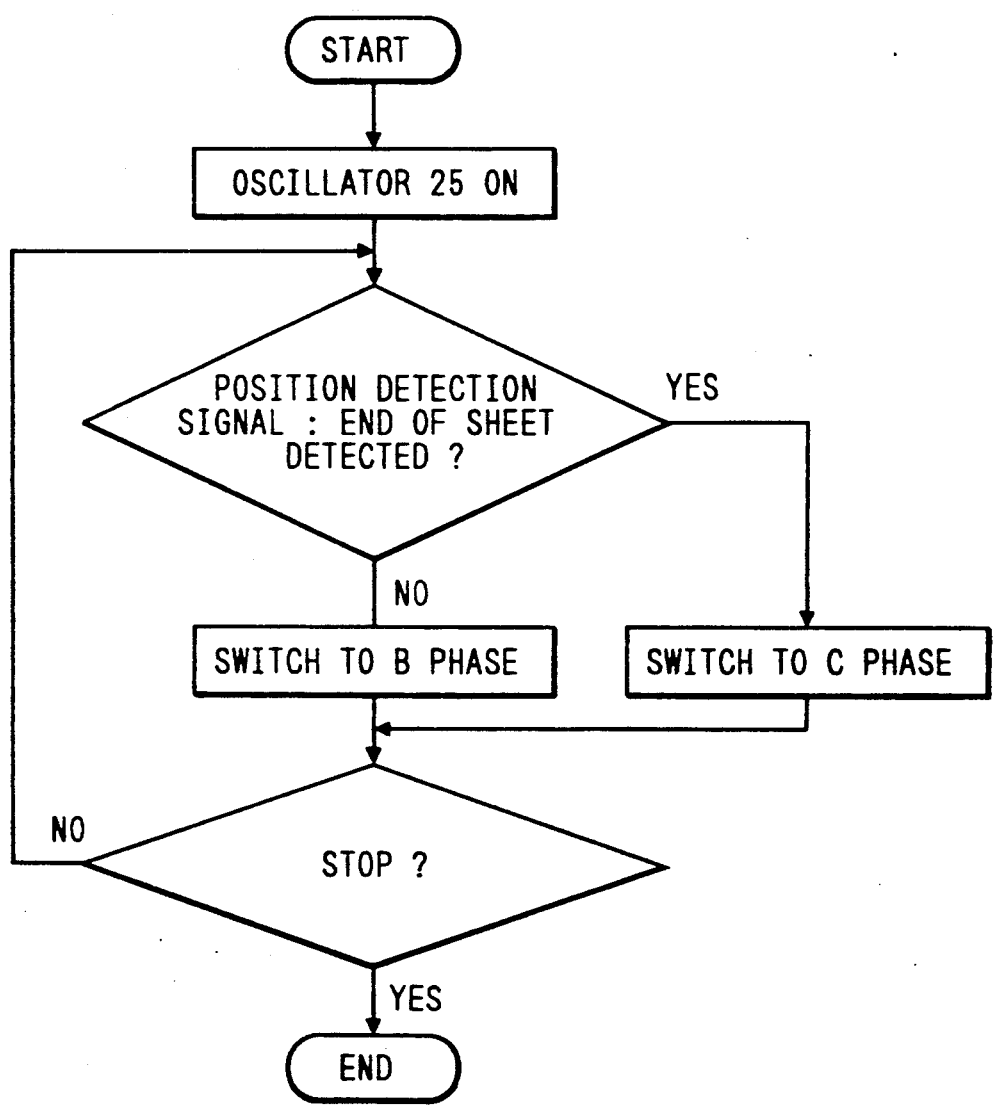

SHEET FEEDING DEVICE

BACKGROUND OF THE INVENTION

I. Field of the Invention

The present invention relates to a sheet feeding device provided for a computer, a copying machine, a facsimile apparatus, a word processor, a typewriter, and various kinds of other machines having a mechanism to feed sheets.

2. Related Background Art

As shown in JP-A-59-177243, hitherto, such a kind of device is constructed in a manner such that a travelling vibration wave is formed in an electric member to sandwich a sheet, thereby feeding the sheet.

The sheet conveyance principle in the above conventional example will now be described with reference to FIG. 6.

A sheet 15 is sandwiched with a moderate pressure by vibration members 13 and 14. A travelling flexural vibration (travelling vibration wave) is formed in each of the vibration members 13 and 14. A phase difference between the travelling vibration waves is spatially set to 180°, so that the travelling vibration waves of the vibration members 13 and 14 progress in a manner such that their convex portions always face the sheet 15 side. At this time, when an attention is paid to a certain material point of, for instance, a convex portion on the surface of each of the vibration members 13 and 14, the material point generally executes a motion which draws an elliptic locus. In FIG. 6, when considering the vibration member 13, in the case where the travelling vibration wave progresses to the right, the above material point draws a clockwise elliptic locus as shown in the drawing. Therefore, the moving direction of the material point of the convex portion of each of the vibration members 13 and 14 is opposite to the travelling direction of the vibration. Such a motion acts as a force to feed the sheet 15.

On the other hand, in the concave portion, although the sheet feeding force in the same direction as the travelling direction is generated, the pressure is smaller than that in the convex portion. Therefore, the frictional forces between the sheet 15 and the vibration members 13 and 14 are small the sheet conveying forces are also small. Thus, as a sum of the sheet feeding forces, the total force acts in the direction opposite to the travelling direction of the flexural vibration mentioned above.

FIG. 7 shows an example of an apparatus for generating a sheet conveying force as mentioned above. Reference numerals 13 and 14 denote the above vibration members. The sheet 15 is sandwiched between both of the opposite vibration members 13 and 14.

The vibration members 13 and 14 are constructed by fixedly attaching vibrators 16 and 17 onto the upper and lower surface sides of elastic members 13a and 14a formed like tracks. Each of the vibrators 16 and 17 comprises two groups of piezo-electric elements. Assuming that the values which are respectively integer times as long as a wavelength λ at a degree which is used for driving are set to circumferential lengths of the elastic members 13a and 14a, both of the piezo-electric element groups are arranged so as to have a positional phase difference which is an odd number times as large as λ/4. By applying AC voltages having a phase difference of 90° to both of the piezo-electric element groups, a travelling vibration wave as shown in FIG. 2A is formed by synthesizing the standing waves which are formed in the elastic members by both of the piezo-electric element groups.

Reference numeral 20 denotes a bottom plate of the sheet feeding device main body fixed to, for instance, a printer; 19A and 19B indicate supporting side plates provided on both sides of the width direction of the bottom plate 20; and 18 represents a press supporting member having a spring property which is arranged between the supporting side plates 19A and 19B.

The lower vibration member 14 is supported by the bottom plate 20 and the upper vibration member 13 is supported by the press supporting member 18. On the other hand, the upper vibration member 13 presses the sheet 15 with a proper force by the spring property of the press supporting member 18 and sandwiches the sheet 15 together with the lower vibration member 14. A certain frequency voltage is applied to each piezo-electric element of the vibration members 13 and 14 and vibrations are applied thereto. Thus, the sheet conveying force is generated because the convex portions of the vibration members 13 and 14 always face as mentioned above, so that the sheet is conveyed in the direction shown by an arrow in the diagram. In the diagram, although arrows indicate both directions, this means that the sheet conveying direction can be reversed by switching the vibration travelling direction.

A thickness of a corresponding rectilinear portion on one side of each of the elastic members 13a and 14a is set to be thinner than that of the other rectilinear portion so as not to come into pressure contact with the sheet, thereby preventing that the feeding force in the direction opposite to the sheet conveying direction is given to the sheet by the rectilinear portion on one side.

However, in the above conventional example, since the elastic members are formed like tracks, the sheet conveying force effectively acts only in the rectilinear portions of the elastic members. Therefore, at the end of the sheet in the conveying direction, a space which cannot be conveyed remains by only a length of the radius in the arc portion of the track. For instance, in the case where a print head 21 is provided in front of the elastic member in the sheet conveying direction, the portion corresponding to only the space which cannot be conveyed becomes an unprintable space. On the other hand, although the above space is reduced if a radius of an arc portion of the elastic member is set to a small value, it is very difficult to design the vibration member having a track shape in which the arc portion is small.

SUMMARY OF THE INVENTION

It is an object of the invention to provide a sheet feeding device in which a sheet can be completely fed out of feeding elastic members.

The above and other objects and features of the present invention will become apparent from the following detailed description and the appended claims with reference to the accompanying drawings.

BRIEF DESCRIPTION OF THE DRAWINGS

FIG. 2A is a diagram showing a forming state of a standing wave by the subvibrator;

FIG. 2B is a diagram showing a waveform of a standing wave;

FIG. 2C is a diagram showing a vibrating state by a rotating vibration;

FIG. 3 is a diagram for explaining the switching of the vibration depending on the position of a sheet;

FIG. 4 is a block diagram of a control system in the embodiment shown in FIG. 1;

FIG. 4A is a diagram showing polarization patterns of main vibrators 5 and 6;

FIG. 5 is a flowchart for explaining the operation;

DETAILED DESCRIPTION OF THE PREFERRED EMBODIMENTS

Figure 1:
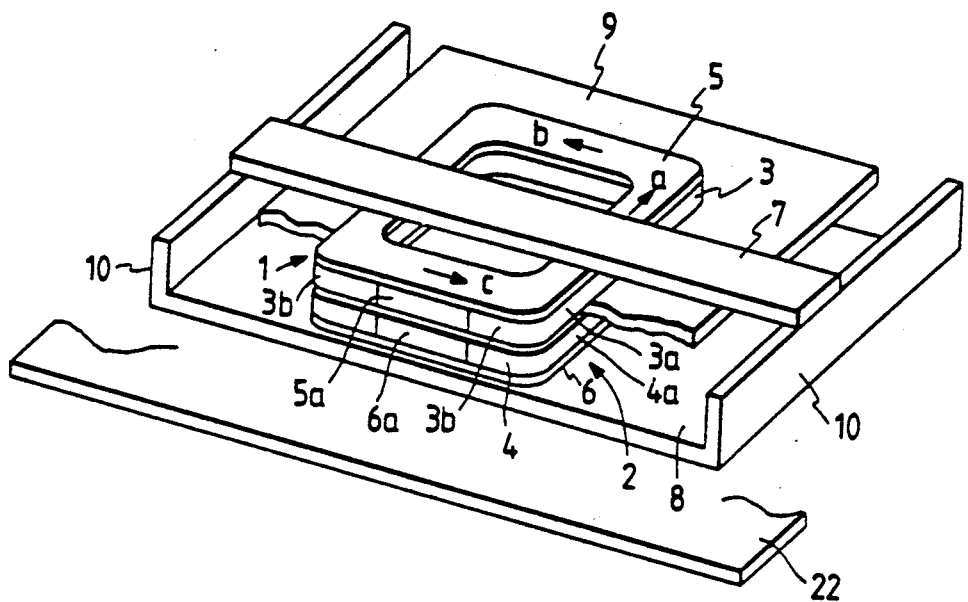
FIG. 1 is an external perspective view showing an embodiment of a sheet feeding device according to the invention.

FIG. 1 is an external perspective view showing an embodiment of a printer to which a sheet feeding device according to the invention was applied.

Reference numeral 1 denotes an upper vibration member and 2 indicates a lower vibration member. The upper vibration member 1 is supported to a supporting member 7 formed by an elastic member such as a spring or the like arranged between supporting side plates 10 of the sheet feeding device main body. The lower vibration member 2 is supported to a bottom plate 8 of the sheet feeding device main body. The lower vibration member 2 is supported to a bottom plate 8 of the sheet feeding device main body. A sheet 9 is sandwiched between the vibration members 1 and 2 with a proper pressure by a pressing spring (not shown) provided on the side of the upper vibration member 1. Reference numeral 22 indicates a base plate of the printer onto which the bottom plate 8 is fixed.

Figure 1A:
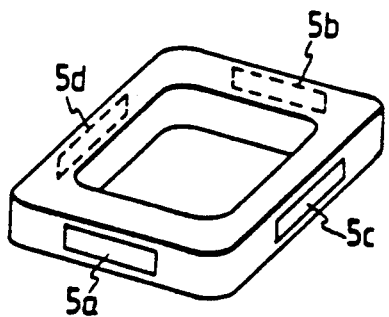
FIG. 1A is a diagram showing an arrangement of a subvibrator.
Figure 6:
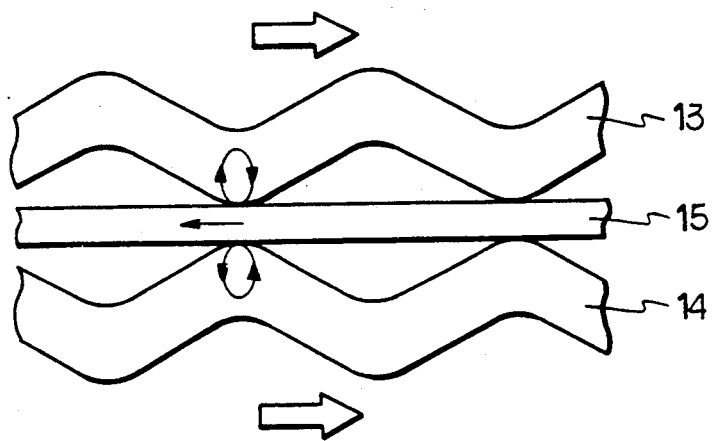
FIG. 6 is a diagram for explaining the conveyance principle.
Figure 7:
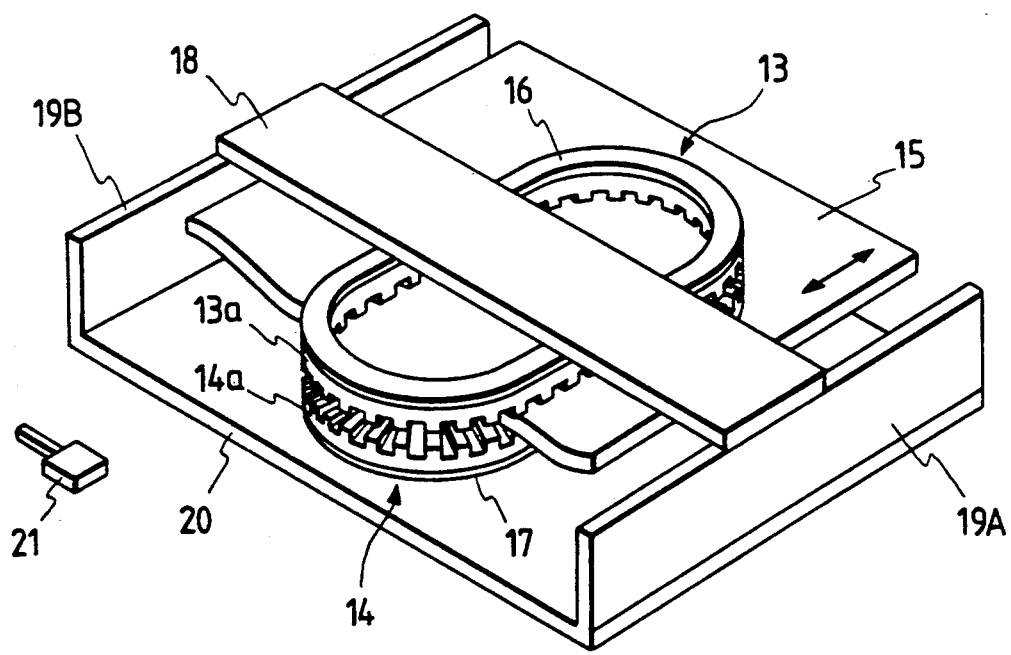
FIG. 7 is an external perspective view of a conventional sheet feeding device.

The vibration members 1 and 2 sandwich the sheet conveying surfaces and are formed into the same shape. The vibration member 1 is constructed in a manner such that a vibrator 5 (hereinafter, referred to as a main vibrator) comprising the well-known two groups of piezo-electric elements mentioned above is fixed onto the upper surface of an elastic member 3 formed in an annular quadrilateral shape having two pairs of rectilinear portions 3a and two pairs of arc portions 3b and, further, a group of piezo-electric elements 5a, 5b, 5c, and 5d (hereinafter, referred to as subvibrator; refer to FIG. 1A for 5b, 5c, and 5d) are respectively fixed to the outside surfaces of four side portions forming the rectilinear portions of the elastic member 3. In a manner similar to the above, the vibration member 2 is constructed in a manner such that a main vibrator 6 is fixed to the lower surface of an elastic member 4 and subvibrators 6a, 6b, 6c, and 6d (6b, 6c, and 6d are not shown) are respectively fixed to the outside surfaces of four side portions of the rectilinear portions of the elastic member 4. In the elastic members 3 and 4 which were arranged so as to face each other, between two rectilinear portions 3a and 4a in which the sheet feeding direction is set to the axial direction, one rectilinear portion (one of the rectilinear portions 3a or one of the rectilinear portions 4a) comes into pressure contact with the sheet 9. A thickness of the other rectilinear portion is set to be slightly thinner than that of the one rectilinear portion, thereby preventing that the sheet comes into pressure contact between the opposite surfaces of the elastic members 3 and 4.

In the vibration members 1 and 2 constructed as mentioned above, when AC voltages having a time phase deviation of 90° are applied to the piezo-electric element groups of the main vibrators 5 and 6 in the vibration members 1 and 2 by a well-known method, travelling vibration waves are generated in the elastic members 3 and 4, for instance, in the directions shown by arrows a, b, and c. Thus, the sheet 9 is fed in the conveying direction by the frictional force of one rectilinear portion of the rectilinear portions 3a and 4a. Since the above principle is the same as that in the conventional example, its description is omitted here.

On the other hand, when the AC voltages are applied to the subvibrators 5a to 5d and 6a and 6d, a standing wave 11 (in-place mode standing wave) in the in-plane direction is generated in the elastic members 3 and 4 as shown in FIG. 2A.

The standing wave 11 is a vibration such that the center of the arc portion 3b (4b) is set to a node and the center of the rectilinear portion 3a (4a) is set to an antinode (refer to FIG. 2A).

On the other hand, when an AC voltage is applied to only one piezo-electric element group of each of the main vibrators 5 and 6, a standing wave 12 (out-of-plane flexural standing wave) which vibrates in the direction perpendicular to the standing wave 11 generated by the above subvibrators and in which the position of the node is the same as that in the case of the standing wave 11 is generated (refer to FIG. 2B).

Therefore, by synthesizing the above two standing waves 11 and 12 with a time phase deviation of 90°, a rotating vibration around an axis in which the center of the arc portion is set to a node and the center of the rectilinear portion is set to an antinode is formed as shown in FIG. 2C.

That is, in FIG. 2A, the standing wave 12 relates to the vibration in the direction (V direction) perpendicular to the paper surface. The standing wave 11 relates to the vibration in the direction (H direction) perpendicular to the standing wave 12. As shown in FIG. 2B, in the case where the standing wave 11 is progressed than the standing wave 12 by the time corresponding to a phase of 90° and resonant frequencies and degrees of both of the standing waves are equalized, respectively, a vibration such that a center point P of the rectilinear portion sequentially rotates such that $P_0 \rightarrow P_1 \rightarrow P_2 \rightarrow P_3$ with the lapse of time as shown in FIG. 2B occurs. A whole vibrating state of the elastic member is as shown in FIG 2C. The above principle has been disclosed in U.S. Pat. No. 4,763,776 (issued on Aug. 16, 1988).

At this time, when the sheet comes into pressure contact with point P, the sheet is fed in the H direction as a sheet feeding direction by the elliptic motion of the vibrator.

In the embodiment, as shown in FIG. 3, when the sheet 9 exists in a first rectilinear portion I shown by reference characters A and B, the sheet 9 is fed by the travelling vibrations wave which is formed by the main vibrators 5 and 6. When an end Q of the sheet 9 has reached a position B, the sheet 9 is fed by the rotating vibration due to the synthesized wave of the standing wave 11 by the subvibrators and the standing wave 12 by one of the piezo-electric element groups of the main vibrators. Therefore, the end of the sheet 9 is fed to the front edge position C of a second rectilinear portion II by the elliptic motion which is caused in the second rectilinear portion II, so that the sheet 9 can be completely removed from the vibration members 1 and 2.

FIG. 4 is a block diagram of a control system to apply AC voltages to the main vibrators 5 and 6 and the subvibrators 5a to 5d and 6a to 6d. Although it is desirable to provide all of the subvibrators 5a to 5d and 6a to 6d on the respective side surfaces, only the subvibrators 5a and 6a need be provided as shown in FIG. 4.

The control of a driving system in FIG. 4 will be described with reference to a flowchart of FIG. 5.

First, a start signal is sent from a drive controller 24 to an oscillator 25 and the oscillator 25 is made operative. One of drive signals generated from the oscillator 25 is input to first piezo-electric element groups 5A and 6A (A phase) of the main vibrators 5 and 6 and the other is connected to a switch 23 through a 90° phase shifter 26. At the other terminals of the switch 23, there are a terminal which is coupled to second piezo-electric element groups 5B and 6B (B phase) of the main vibrators 5 and 6 and a terminal which is connected to the piezoelectric elements 5a and 6a as subvibrators (C phase).

Polarizing directions of the main vibrators 5 and 6 which are formed by the electromechanical energy conversion elements are set as shown in FIG. 4A.

A sheet position detection member 30 of the sheet 9, for instance, a photo sensor is arranged near the end of the rectinlinear portion I along the sheet feeding direction of the elastic member 3 or 4. A detection signal is input to the switch 23. When the sheet position detection member 30 does not detect the end of the sheet, the switch 23 is connected to the B phase. In this state, a travelling wave in which the two modes excited by the A and B phases were overlaid is generated in the elastic members 3 and 4, thereby feeding the sheet 9 in, for instance, the direction as shown by an arrow. Then, when the sheet is conveyed and the end of the sheet is detected by the detection member 30, a detection signal is input to the switch 23 and the switch 23 is switched from the B phase to the C phase. Thus, in the elastic members 3 and 4, the standing wave vibration in the vertical direction and the standing wave vibration by the C phase (the vibration in the direction perpendicular to the vibration in the A phase) are synthesized in the sheet by the A phase. As mentioned above, the rotating vibration is excited in the rectilinear portion I and the rectilinear portion II provided along the line which transverses the sheet feeding direction. Thus, the sheet 9 is fed until the end portions of the vibration members 1 and 2 by the elliptic vibration of the rectilinear portion II.

In the above embodiment, although the standing waves 11 and 12 are the vibrations of the same degree, the degrees can be also set to different degrees if the positions of the nodes at the centers of the arc portions almost coincide and the resonant frequencies are almost equal. For instance, as shown in FIG. 2A, even if the standing wave 11 is set in a mode such that the antinode of the vibration is located at the center of the rectilinear portion and ½ wavelength exists in the rectilinear portion and the standing wave 12 is set in a mode such that the center of the rectilinear portion is set to a node and one wavelength exists in the rectilinear portion, it is sufficient that the node of the mode of a high degree (standing wave 12) exists at the position of the node of the mode of a low degree (standing wave 11).

On the other hand, lengths of the first and second rectilinear portions I and II may be set to be different.

Although the elastic members 3 and 4 in the rectilinear portions I and II to feed the sheet 9 such as paper, film, or the like are in contact with each other, the elastic members 3 and 4 in the rectilinear portions III and IV are away from each other.

As described above, according to the invention, since the travelling wave vibration and the rotating vibration can be independently excited in the quadrilateral elastic member, the end margin upon feeding of the sheet can be eliminated.

In the above embodiment, although the vibration member has been set into a quadrilateral shape having four rectilinear portions, it is also possible to use a vibration member a part of which is formed by an arc portion, for instance, a track-shaped vibration member. Further, if a biasing member for allowing the sheet to become into pressure contact with the vibration member is provided, it is not always necessary to provide two vibration members but one vibration member can be also provided.

What is claimed is:

1. A feeding device for a sheet, comprising:
  (a) a quadrilateral vibration member having a frictional surface in contact with the sheet, the member having at least a first side surface and a second side surface provided at a side surface different from the first side surface;
  (b) a first electromechanical energy conversion member, fixed to the first side surface of said vibration member, for producing a travelling vibration wave along a feeding direction of the sheet in said vibration member in response to an applied electrical signal, thereby causing a movement of the sheet;
  (c) a second electromechanical energy conversion member, fixed to the second side surface of the vibration member, for producing a rotating vibration which transverses the feeding direction of the sheet in the vibration member in response to an applied electrical signal, thereby causing a movement of the sheet; and
  (d) control circuit means for applying the applied electrical signal to said first electromechanical energy conversion member and for applying the applied electrical signal to said second electromechanical energy conversion member when the sheet has reached near the second electromechanical energy conversion member by the travelling vibration wave.

2. A feeding device according to claim 1, wherein said first electromechanical energy conversion member has two piezo-electric element groups to which the electrical signal is supplied.

3. A feeding device according to claim 1, wherein when the sheet has reached near the second electromechanical energy conversion member, said control circuit means applies the electrical signal to said first and second electromechanical energy conversion members.

4. A feeding device according to claim 2, wherein said control circuit means includes a member for simultaneously supplying said electrical signal to one of said two piezo-electrical element groups and the second electromechanical energy conversion member in response to the sheet having been moved to a predetermined position.

5. A feeding device according to claim 4, wherein said signal supplying member includes:

an oscillator for generating the electrical signal to be supplied to one of said two piezo-electric element groups;

a phase shifter for generating an electrical signal whose electrical phase is different from an output signal generated from said oscillator in response to said output signal; and a signal switching element for selectively supplying the electrical signal generated from said phase shifter as the applied electrical signal to either one of said two piezo-electric element groups or the second electrical energy conversion member.

6. A feeding device according to claim 5, further comprising:

a sheet position detector for producing a change-over signal to be applied to the signal switching element when the sheet has reached near said second electromechanical energy conversion member.

7. A feeding device according to claim 6, wherein said second electromechanical energy conversion member includes a piezo-electric element.

8. A feeding device system comprising:
(a) a sheet to be fed;
(b) a vibration member, a part of which is formed arcuately, said member having a frictional surface in contact with sheet and having at least a first side surface and a second side surface provided at a side surface different from said first side surface;
(c) a first electromechanical energy conversion member, provided at said first side surface of said vibration member, for producing a travelling vibration wave in said vibration member in response to an applied first electrical signal, thereby causing a relative movement between said sheet and said vibration member;
(d) a second electromechanical energy conversion member, provided at said second side surface of said vibration member, for producing a rotating vibration in the vibration member in response to an applied second electrical signal, thereby causing a relative movement between said sheet and said vibration member, in which a vibrating direction of the rotating vibration is different from a vibrating direction of the travelling vibration wave by a predetermined angle; and
(e) control circuit means for applying the first electrical signal to said first electromechanical energy conversion member and for applying the second electrical signal to said second electromechanical energy conversion member when said sheet has been fed to a predetermined position by the travelling vibration wave.

9. A feeding system comprising:
(a) a sheet;
(b) a vibration having a friction surface in contact with said sheet, said vibrator having a first friction portion in contact with said sheet and a second friction portion provided in a direction transverse to said first friction portion, said vibrator also having a first electromechanical energy conversion element provided on said first friction portion so as to generate a travelling vibration wave in said vibrator in response to an applied first electrical signal and a second electromechanical energy conversion element provided in said second friction portion so as to generate a rotating vibration in said vibrator in response to an applied second electrical signal, and the travelling vibration wave and the rotating vibration causing a relative movement between said sheet and said vibrator; and
(c) control circuit means for applying the first electrical signal to said first electromechanical energy conversion member and for applying the second electrical signal to said second electromechanical energy conversion element when said sheet and said vibrator are spaced away from each other by a predetermined amount by the travelling vibration wave.

10. A system for feeding a sheet, comprising:
(a) a vibrator having a friction surface in contact with the sheet, said vibrator having a first friction portion in contact with the sheet and a second friction portion which is in contact with the sheet and is provided in a direction transverse to said first friction portion, said vibrator also having a first electromechanical energy conversion element provided on said first friction portion so as to generate a travelling vibration wave in said vibrator in response to an applied first electrical signal and a second electromechanical energy conversion element provided on said second friction portion so as to generate a rotating vibration in said vibrator in response to an applied second electrical signal, and the travelling vibration wave and the rotating vibration causing a relative movement between the sheet and the vibrator; and
(b) control circuit means for applying the first electrical signal to said first electromechanical energy conversion element and for applying the second electrical signal to said second electromechanical energy conversion element when the sheet and said vibrator are spaced away from each other by a predetermined amount by the travelling vibration wave.

11. A feeding device for a sheet, said device comprising:
(a) a vibrator having a friction surface in contact with the sheet, said vibrator having a first friction portion in contact with the sheet and a second friction portion provided in a direction transverse to said first friction portion, said vibrator also having a first electromechanical energy conversion element provided on said first friction portion so as to generate a travelling vibration wave in said vibrator in response to an applied first electrical signal and a second electromechanical energy conversion element provided in said second friction portion so as to generate a rotating vibration in said vibrator in response to an applied second electrical signal, and the travelling vibration wave and the rotating vibration causing a relative movement between the sheet and the vibrator; and
(b) said control circuit member for energizing said second electromechanical energy conversion element so that said second electromechanical energy conversion element generates the rotating vibration when the sheet and said vibrator are spaced away from each other by a predetermined amount by the travelling vibration wave.

12. A system for feeding a sheet, said system comprising:
(a) a vibrator having a friction surface in contact with a friction surface of the sheet, said vibrator having a first friction portion in contact with the sheet and a second friction portion provided in a direction transverse to said first friction portion, said vibrator also having a first electromechanical energy conversion element provided in said first friction portion so as to generate a travelling vibration wave in said vibrator in response to an applied first electrical signal and a second electromechanical energy conversion element provided on said second friction portion so as to generate a rotating vibration in said vibrator in response to an applied second electrical signal, and the travelling vibration wave and the rotating vibration causing a relative movement between the sheet and said vibrator;

(b) a control member for energizing said second electromechanical energy conversion element so that said second electromechanical energy conversion element generates the rotating vibration when the sheet and said vibrator are spaced away from each other by a predetermined amount by the travelling vibration wave; and (c) a member for supporting said vibrator at a predetermined position.

13. A system according to claim 12, wherein said supporting member includes a base plate for a printer.

* * * * *

UNITED STATES PATENT AND TRADEMARK OFFICE
CERTIFICATE OF CORRECTION

PATENT NO. : 5,094,444

DATED : March 10, 1992

INVENTOR(S) : HIROYUKI SEKI

It is certified that error appears in the above-identified patent and that said Letters Patent is hereby corrected as shown below:

On the Title page, item [56] References Cited - FOREIGN PATENT DOCUMENTS

"1-22846 5/1989 Japan" should read --1-122846 5/1989 Japan--.
"1-4569 6/1989 Japan" should read --1-64569 6/1989 Japan--.

COLUMN 1

Line 14, "electric" should read --elastic--.

COLUMN 3

Line 14, "the" should read --the sheet--.

COLUMN 4

Line 17, "(in-place" should read --(in-plane--.
Line 60, "vibrations" should read --vibration--.

COLUMN 6

Line 63, "piezo-electrical" should read --piezo-electric--.

UNITED STATES PATENT AND TRADEMARK OFFICE
CERTIFICATE OF CORRECTION

PATENT NO. : 5,094,444
DATED : March 10, 1992
INVENTOR(S) : HIROYUKI SEKI

It is certified that error appears in the above-identified patent and that said Letters Patent is hereby corrected as shown below:

COLUMN 7

Line 22, "device" should be deleted.
Line 26, "with" should read -- with said--.

COLUMN 8

Line 55, "circuit" should be deleted.

COLUMN 9

Line 6, "on" should read --in--.

Signed and Sealed this

Fifteenth Day of June, 1993

Attest:

MICHAEL K. KIRK

Attesting Officer

Acting Commissioner of Patents and Trademarks